(12) United States Patent
Ristau

(10) Patent No.: US 6,827,344 B1
(45) Date of Patent: Dec. 7, 2004

(54) LOW-PRESSURE HOLDING DEVICE

(76) Inventor: Harald Ristau, Vor dem Hassel 8, Brackel (DE), D-21438

(*) Notice: Subject to any disclaimer, the term of this patent is extended or adjusted under 35 U.S.C. 154(b) by 0 days.

(21) Appl. No.: 10/088,159

(22) PCT Filed: Jul. 18, 2000

(86) PCT No.: PCT/DE00/02362
§ 371 (c)(1),
(2), (4) Date: Mar. 14, 2002

(87) PCT Pub. No.: WO01/20177
PCT Pub. Date: Mar. 22, 2001

(30) Foreign Application Priority Data
Sep. 15, 1999 (DE) .......................................... 299 16 197

(51) Int. Cl.[7] .............................................. B25B 25/00
(52) U.S. Cl. ....................................................... 269/21
(58) Field of Search .......................... 269/21, 3, 6, 95; 294/64.1, 65; 248/362, 36–3

(56) References Cited

U.S. PATENT DOCUMENTS

| | | | | |
|---|---|---|---|---|
| 3,716,307 A | * | 2/1973 | Hansen | 269/21 |
| 4,356,989 A | * | 11/1982 | Ireland | 269/21 |
| 5,184,858 A | * | 2/1993 | Arai | 294/64.1 |
| 5,285,966 A | * | 2/1994 | Czech | 239/321 |
| 5,511,752 A | | 4/1996 | Trethewey | |
| 5,553,837 A | | 9/1996 | Kahle | |
| 5,795,001 A | * | 8/1998 | Burke | 294/64.1 |
| D421,556 S | * | 3/2000 | Smith | D8/14 |

FOREIGN PATENT DOCUMENTS

| | | |
|---|---|---|
| DE | 4013747 | 10/1991 |
| DE | 29916197.8 | 3/2000 |
| EP | 0606042 | 7/1994 |
| FR | 895006 | 1/1945 |
| FR | 2577808 | 8/1986 |
| GB | 1193899 | 6/1970 |
| GB | 1534235 | 11/1978 |
| WO | WO 8604819 | 8/1986 |
| WO | 9711282 | 3/1997 |

OTHER PUBLICATIONS

DE4,013,747, Oct. 1991 Abstract (1 pg).

* cited by examiner

*Primary Examiner*—Lee D. Wilson
(74) *Attorney, Agent, or Firm*—Muserlian, Lucas and Mercanti

(57) ABSTRACT

The invention relates to a low-pressure holding device (1) with a low-pressure chamber (5) and a valve (9) for the permanent hold on gas-impermeable surfaces (14). The low-pressure holding device is fixed to a supporting surface by means of a piston suction pipe (13) which is detachably connected to the inventive device. The low-pressure holding device can be provided with a receptacle for holding appliances (2).

13 Claims, 2 Drawing Sheets

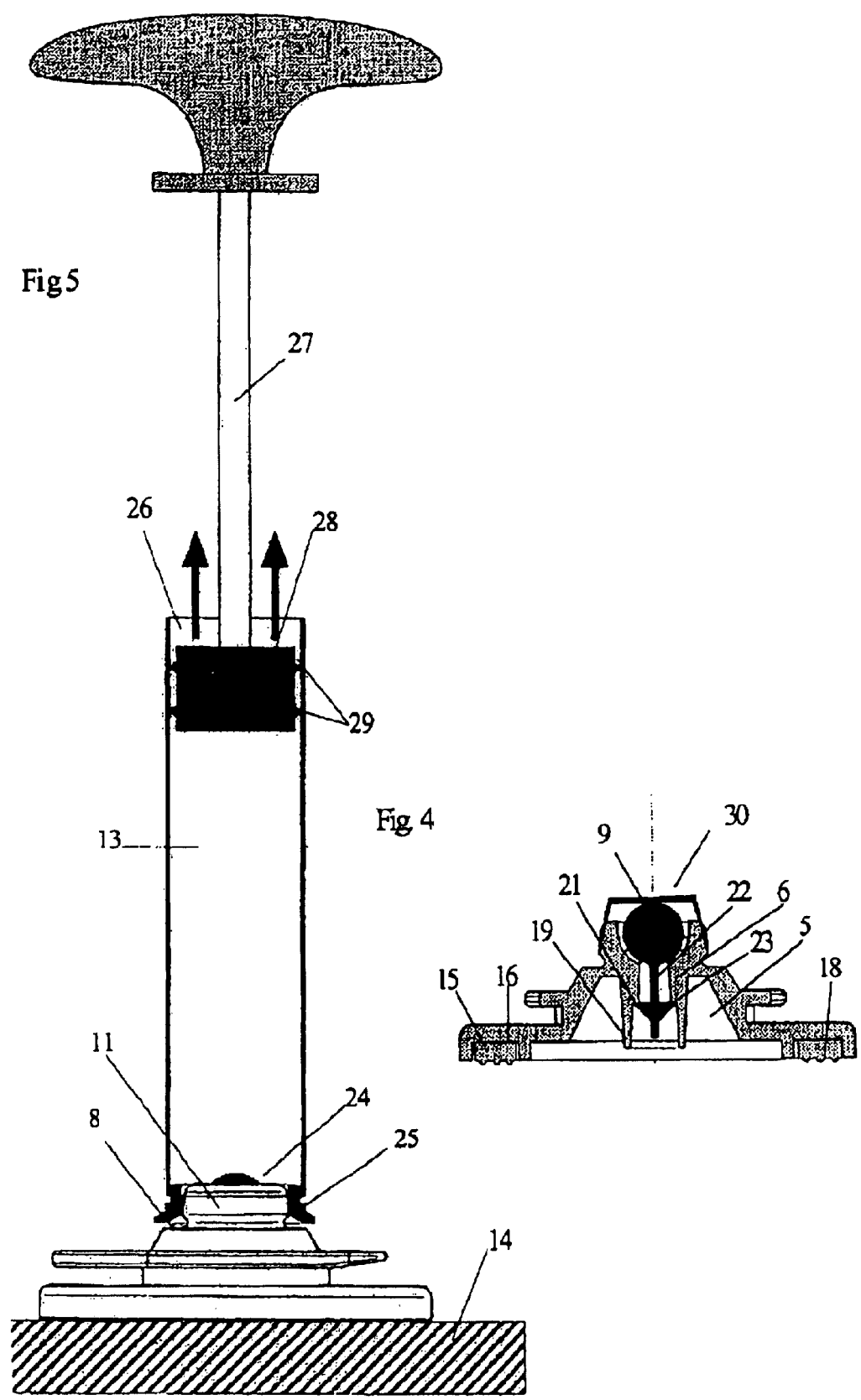

LOW-PRESSURE HOLDING DEVICE

This application is a 371 of PCT/DE00/02362 filed Jul. 18, 2000.

The invention relates to a vacuum holding device with a vacuum chamber and valve for permanent holding to surfaces substantially impermeable to gas.

Vacuum holding devices such as suction-cup fastenings are inherently known. Conventional suction-cup fastenings have a suction cup which is made of an elastic plastic material and should ensure an airtight seal between the suction cone and a smooth, gas-impermeable contact surface, e.g. a bathroom tile. The vacuum required for the adhesive action in the suction chamber is produced by pressing the plate-shaped suction surface onto the contact surface whereby air escapes from the suction chamber and a vacuum is produced by means of the restoring force of the elastic material. If necessary, surface adhesion forces are also involved in the adhesive action.

Also known are suction-cup fastenings which allow easy removal of the suction-cup fastening from the contact surface, where by means of a seal to be opened, the vacuum in the suction chamber is raised by equalising with the ambient pressure. For this purpose U.S. Pat. No. 5,511,752 proposes a cap mounted displaceably on a suction cup wherein the sliding or lifting of the cap brings about the opening of the suction chamber to the outside and an inflow of ambient air. The vacuum responsible for the suction action is removed, which releases the suction cap.

U.S. Pat. No. 5,553,837 also discloses a vacuum holding device for workpieces which has vacuum chambers and airtight-closing seals to the bearing surfaces in order to hold workpieces tightly on surfaces by application of vacuum by means of a connection to a vacuum pump or to release them again by reestablishing normal pressure.

DE 40 13 747 or WO 97/11282 disclose how the suction action of a suction cup is produced by means of a hand pump connected securely to the suction cup or is re-established again in the event of pressure loss.

The afore-mentioned embodiments either do not allow any permanent holding on especially rough surfaces or they have such complex structures that they cannot be manufactured easily and at low cost.

The object of the invention is to overcome known disadvantages from the prior art and provide an alternative to adhesive or plug fastening which is of similar permanent strength, can also be removed easily and without damage to the surfaces and does not have the disadvantage of conventional suction cups, of adhering only to very smooth surfaces and not permanently.

The object is solved according to the invention by a vacuum holding device 1, which has:
- a vacuum chamber 5 which is open to a contact surface 14,
- a seal 15 which closes the vacuum chamber gas-tight from the outside towards the contact surface 14,
- an opening as the end of a connection between the vacuum chamber and the external environment 7,
- a valve 9 which ensures gas-tight closure and opening of the connection between the vacuum chamber 5 and the external environment 7 and
- means for producing a detachable, substantially gastight coupling between the outwardly directed opening and a device for generating vacuum 13.

Preferred embodiments are the subject of the subclaims.

The vacuum holding device is preferably made of plastic, e.g., of an impact-resistant plastic such as ABS and is also designed as preferably round or oval in relation to the contact surface.

The connection between the vacuum chamber and the external environment is preferably constructed in the form of a dome having a conical recess at the upper end in the form of an outwardly opening conical, spherical or hemispherical bearing surface to accommodate the valve.

The valve is also constructed as conical, spherical or hemispherical according to the bearing surface of the dome in order to ensure reliable seating. The valve tapers towards the vacuum chamber. It acts as a suction/sealing valve. The valve is preferably held, if necessary under pre-tensioning, in the bearing surface using an elastic means such as an elastic strip or rod or a spring which can be part an integral part of the valve.

The dome is preferably constructed so that it forms a stop for the end of the elastic means, e.g. the valve can be constructed so that it initially tapers spherically, hemispherically or conically downwards and extends further downwards in a strip or rod fashion. At the end of the strip or rod is a support which can be constructed in the form of one or several, preferably two spaced pins or a wedge.

The valve consists of a rubber-elastic material, at least in the regions in contact with the bearing surface, so that the valve is reversibly deformable at least in the upper spherical, hemispherical or conical region, e.g. under the action of forces such as can be exerted with the fingers.

The seal which closes the vacuum chamber gastight towards the outside against the contact surface is preferably a flat seal made of an elastic material, if necessary provided on one side and/or on both sides with compensating ribs. The elastic material preferably exhibits an optimised hardness and elasticity in relation to the contact surface.

The apparatus for producing the vacuum is preferably a manual, i.e., hand-actuated, piston suction pipe which has openings at the beginning and at the end of the suction path. The piston suction pipe has a piston pull rod with built-in tension holding device and also a suction piston which is preferably made of elastic material such as rubber and is sealed against the suction pipe, for example, using sealing lips. In order that the piston suction pipe can also be used in the vertical position, the lower opening of the suction pipe can be also be connected at an angle to the detachable coupling. If necessary, the piston suction pipe can also have, centrally at the lower opening, a retaining device for the valve, perhaps a dome, which prevents the valve from being lifted out of the receiving surface by the suction action of the piston suction pipe. The device for producing the vacuum and the vacuum holding device are constructed in two parts.

According to a preferred embodiment, the vacuum holding device is positioned on the contact surface and the piston suction pipe with a seal located at the lower opening is placed on the coupling surface under a slight supporting pressure. By withdrawing the piston pull rod from the suction pipe, the valve is slightly raised from the pre-stressing and the atmosphere still present is largely extracted from the vacuum chamber. At the instant when the suction piston passes the upper opening, which is preferably formed by the pipe itself still open at the top in the cross-section, the conical/spherical valve is pressed against its bearing surface by the pre-stressing and the pressure difference now built up, and closes the vacuum chamber airtight against the external pressure. When passing the upper opening, it is important that a large quantity of ambient air enters the suction piston at once so that the valve of the vacuum holding device closes as quickly as possible as a result of the sudden change in pressure. The correct handling of the piston suction pipe can be monitored by a loudly perceivable "plop" when the piston pull rod is withdrawn from the suction pipe.

The vacuum holding device can easily be removed from the bearing surface by opening the valve. The valve is opened by deforming or moving it by lateral pressure e.g. with the finger, wherein a connection is established with the external environment and pressure equalisation is brought about between the ambient pressure and the vacuum chamber.

All substantially air-impermeable base materials such as ceramic, earthenware, plastic-coated woods, glass or metal surfaces are suitable for applying the vacuum holding device. In particular, even for rough structures no holes or other insertion of screws or nails which damage the holding surfaces is required for a permanent hold. The vacuum holding device according to the invention allows a reversible and disturbance-free attachment.

According to a further embodiment of the invention, at its upper side facing away from the holding surface, the vacuum holding device has a device configured as a receptacle which can, for example, accommodate equipment or holders for accommodating objects. The receiving device can be designed so that it can accommodate a wide range of accessories in the sense of a system.

The receiving device is preferably designed as swallowtail-shaped, wherein the connection is made by pushing onto the narrower side of the swallowtail.

The upper side can also be designed so that it allows the possibility of a screw fastening by constructing, for example, on the upper side a thread, a hole or some other receptacle for a screw fastening. The screw fastening can be used to accommodate a hook.

In an embodiment not according to the invention, the vacuum holding device can also be used as a single-point fastening by screwing a screw through the dome into the holding surface. Twisting of the vacuum holding device can be prevented by the flat seal which is present. The vacuum holding device sits securely and free from rotation on the holding surface.

The vacuum holding device can be used for example, in the household, in motor caravans, sailing boats, motor yachts, on high-quality wainscoting, in fair construction or in medicine, possibly in operating theatres, especially in those areas where no screwing or sticking can or may be used.

The object of the invention is explained in greater detail subsequently with reference to the drawings.

FIG. 4 shows a section through the vacuum holding device along the line A-B.

FIG. 5 shows the piston suction pipe placed on the vacuum holding device.

Figure 1:
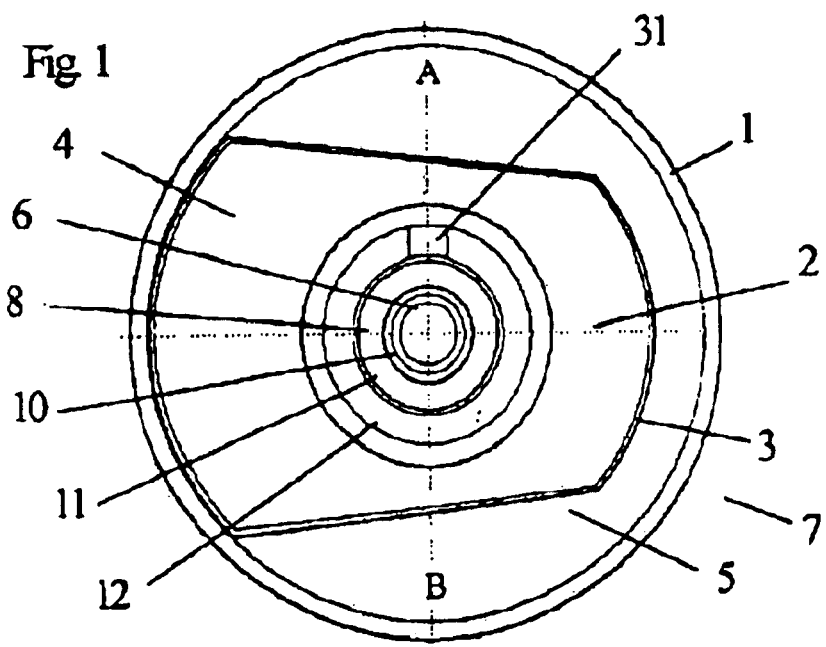
FIG. 1 shows the vacuum holding device from above.
Figure 2:
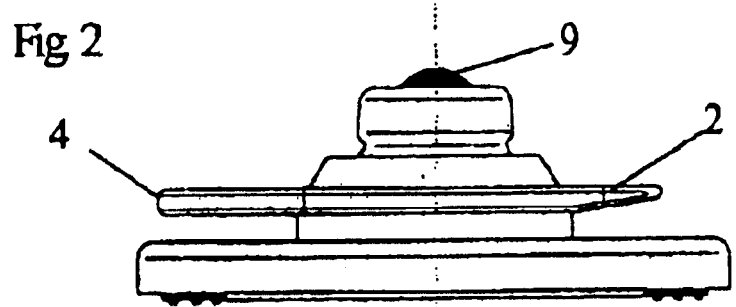
FIGS. 2 and 3 show the vacuum holding device in a side view (FIG. 2) or from below (FIG. 3).
Figure 3:
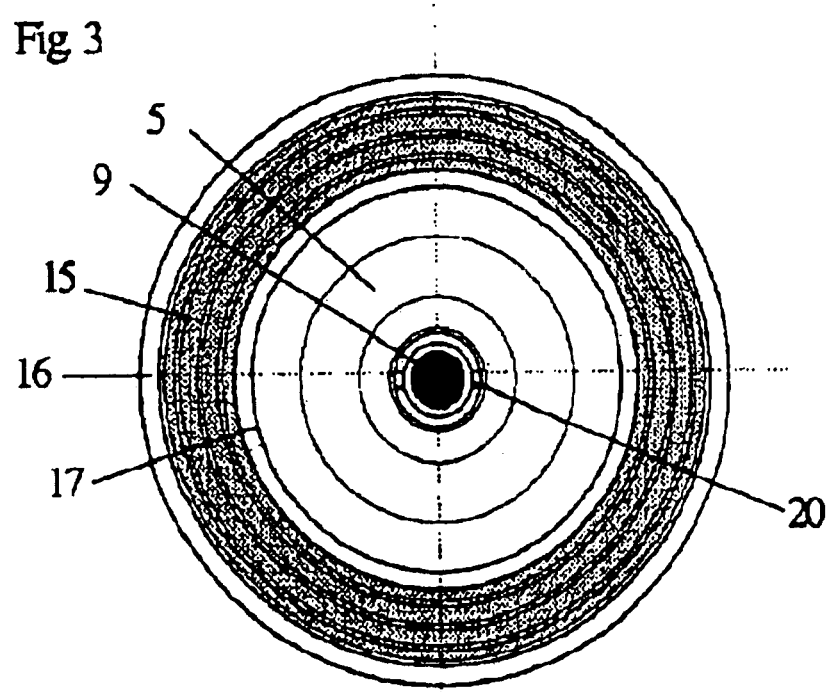

The vacuum holding device 1 has on its upper side a holding receptacle 2 for the equipment holder in a swallowtail shape. On the short, upwardly directed side 3 of the holding receptacle there is pushed on the equipment holder which is securely anchored by pushing downwards in the direction of the long side 4 of the swallowtail-shaped holding receptacle 2. The vacuum holding device 1 is constructed such that it is substantially round wherein the outer wall of the vacuum chamber 5 extends downwards in a plate-shaped fashion. At the centre is shown the dome 6 to produce a connection between the vacuum chamber 5 and the external environment 7. The dome 6 has a cylindrical shape in the downward direction and a round, substantially hemispherical opening extending outwards in the upward direction which forms the bearing surface 8 for the spherical valve 9. The bearing surface has a circular groove 10 which provides an airtight seal with the other surface of the spherical valve. The circular surface 12 directed parallel to the contact surface 14 and, if necessary, the upper and/or lateral outer upper edge 11 of the dome, form sealing surfaces to produce a detachable airtight coupling with the suction pipe 13.

The vacuum chamber 5 extends downwards towards the contact surface 14 in a plate-shaped fashion. The airtight closure of the vacuum chamber to the contact surface is accomplished by a flat seal 15 which is inserted circularly in a receiving surface 16 at the edge 17 of the vacuum chamber. The flat seal can, if necessary, have ring-shaped grooves 18 on both sides.

The dome 6 is constructed so that it is guided downwards in a pipe shape until just above the bearing surface. This has the advantage that during the formation of a vacuum yielding contact surfaces cannot bulge excessively upwards and are retained by the lower end of the dome 19. As a precaution there are slits 20 located at the lower end of the dome 19 which ensure that, during the production of a vacuum, the vacuum chamber can be sufficiently well evacuated even if the contact surface is upwardly bulging. The dome also has on its inside a projection 21 which is constructed so that it fixes the valve sphere with an elastic extension 22 and a pin- or wedge-shaped support 23 in the bearing surface 8 under elastic stress by means of the upper edge of the support 23.

The upper and lateral outer upper edge 11 of the dome and the circular surface 12 located beneath it, directed parallel to the contact surface 14 form, as it were, sealing surfaces to produce a detachable airtight coupling with the piston suction pipe 13. The suction pipe to produce a vacuum is also constructed as a piston suction pipe which has openings at the beginning and at the end of the suction path. The lower opening of the suction pipe 24 is closed by a seal in the form of a circular rubber 25. The upper opening is formed 26 by the suction pipe open at the top. The piston suction pipe also has a piston pull rod 27 with built-in tension holding device and a suction piston 28 which is preferably made of elastic material such as rubber and is sealed against the suction pipe with sealing lips 29.

The upper edge of the dome can be closed by a cap 30 which can be removed, for example, by inserting a screwdriver head in an outlet or projection 31 in the cap itself or in the surface 12. The cap also has the effect of pressing the elastic valve through the inner surface of the cap cover into the bearing surface 8 of the dome, providing additional sealing.

List of reference symbols

1 Vacuum holding device
2 Holding receptacle
3 Short side of holding receptacle
4 Long side of holding receptacle
5 Vacuum chamber
6 Dome
7 External environment, outside
8 Bearing surface
9 Valve
10 Circular grooves of bearing surface
11 Outer upper edge of dome
12 Surface
13 Piston suction pipe
14 Contact surface
15 Flat seal 16 Receiving surface
17 Edge of vacuum chamber
18 Annular grooves of flat seal
19 Lower end of dome
20 Slits in dome
21 Projection in dome
22 Elastic extension
23 Pin- or wedge-shaped support
24 Lower opening of suction pipe
25 Circular rubber
26 Suction pipe
27 Piston pull rod
28 Suction piston
29 Sealing lips
30 Cap
31 Outlet

What is claimed is:

1. A vacuum holding device with apparatus for producing a vacuum, wherein
   the vacuum holding device and the apparatus for producing a vacuum are constructed in two parts and are detachable connected substantially gastight by positioning against each other,
   wherein the vacuum holding device comprises:
   a vacuum chamber which is open in the direction of a contact surface,
   an outwardly directed opening as the end of a connection from the vacuum chamber to an external environment,
   a valve which ensures gastight closing and opening of the connection between the vacuum chamber and the external environment
   means for producing a detachable substantially gastight coupling between the outwardly directed opening and the apparatus to produce a vacuum,
   the vacuum holding device comprises a seal which seals the vacuum chamber gastight against the contact surface towards the outside,
   wherein the apparatus for producing a vacuum comprises
   a suction piston and a piston suction pipe wherein the suction pipe has a first opening at the beginning of the suction path,
   the valve of the vacuum holding device is liftable from his seat by moving the suction piston in the direction from the first to the second opening and
   a second opening at the end of the suction path which is fully passable by the suction piston so that when the second opening is fully passed by the suction piston ambient air penetrates in one stroke into the piston suction pipe to close the valve of the vacuum holding device.

2. The vacuum holding device according to claim 1, wherein the valve is constructed as a form selected from the group consisting of substantially conical, spherical and hemispherical.

3. The vacuum holding device according to claim 1 wherein the connection between the vacuum chamber and the external environment has a form selected from the group consisting of conical, spherical and hemispherical bearing surface to accommodate the valve.

4. The vacuum holding device according to claim 1 wherein at least in the regions in contact with the bearing surface, the valve consists of a rubber elastic material.

5. The vacuum holding device according to claim 1 wherein one part of the means for producing a detachable, substantially gastight coupling from an upwardly directed opening is a surface.

6. The vacuum holding device according to claim 1 wherein the detachable, substantially gastight coupling is formed by a rubber seal between the surface and attachment of the device to produce a vacuum.

7. The vacuum holding device according to claim 1 wherein the surface for attaching the device to produce a vacuum is directed to the contact surface of the vacuum holding device.

8. The vacuum holding device according to claim wherein the vacuum holding device has a holding receptacle for an equipment holder.

9. A method for securing a vacuum holding device with an apparatus for producing a vacuum according to claim 1 to a contact surface comprising:
   positioning the vacuum holding device on a contact surface,
   producing a detachable, substantially gastight coupling between the outwardly directed opening of the vacuum holding device and a piston suction pipe,
   producing a vacuum in a vacuum chamber by moving a suction piston in the direction from a first opening at the beginning of the suction path to a second opening at the end of the suction path and opening the valve of the vacuum holding device by the movement of the suction piston and
   further withdrawing the suction piston from the piston suction pipe until the suction piston passes the second opening so that when the second opening is fully passed by the suction piston ambient air penetrates in one go into the piston suction pipe to close the valve of the vacuum holding device and
   removing the apparatus for producing a vacuum.

10. A vacuum holding device, wherein the vacuum holding device has:
    a vacuum chamber which is open in the direction of the contact surface,
    an opening as the end of a connection between the vacuum chamber and the external environment,
    a valve which ensures gastight closing and opening of the connection between the vacuum chamber and the external environment and
    means for producing a detachable substantially gastight coupling between the outwardly directed opening and an apparatus for producing a vacuum,
    the valve is constructed as a form selected from the group consisting of substantially conical, spherical or hemispherical and
    the connection between the vacuum chamber and the external environment has a form selected from the group consisting of conical, spherical and hemispherical bearing surface to accommodate the valve,
    the vacuum holding device has a seal which closes the vacuum chamber gastight towards the outside against the contact surface,
    the valve extends as a strip or rod wherein at the end of the strip or rod there is at least one support in the form of at least one member of the group consisting of pin and wedge.

11. The vacuum holding device according to claim 10 wherein the extension of the valve is elastic to hold the valve in the bearing surface.

12. The vacuum holding device according to claim 10 wherein the seal is a flat seal made of elastic material.

13. The vacuum holding device according to claim 1 wherein the seal is a flat seal made of an elastic material.

* * * * *